(12) United States Patent
Dixneuf et al.

(10) Patent No.: US 10,502,635 B2
(45) Date of Patent: Dec. 10, 2019

(54) TEMPERATURE SENSOR

(71) Applicant: Valeo Systemes de Controle Moteur, Cergy Saint Christophe (FR)

(72) Inventors: Olivier Dixneuf, Cergy Saint Christophe (FR); Piotr Zakrzewski, Cergy Saint Christophe (FR); Denis Gravat, Cergy Saint Christophe (FR); Nicolas Gelez, Cergy Saint Christophe (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 220 days.

(21) Appl. No.: 15/527,956

(22) PCT Filed: Nov. 18, 2015

(86) PCT No.: PCT/FR2015/053119
§ 371 (c)(1),
(2) Date: Sep. 7, 2017

(87) PCT Pub. No.: WO2016/079428
PCT Pub. Date: May 26, 2016

(65) Prior Publication Data
US 2018/0202866 A1   Jul. 19, 2018

(30) Foreign Application Priority Data

Nov. 19, 2014   (FR) ..................... 14 61206

(51) Int. Cl.
*G01K 1/00* (2006.01)
*G01K 7/00* (2006.01)
(Continued)

(52) U.S. Cl.
CPC ................. *G01K 1/08* (2013.01); *G01K 7/02* (2013.01); *G01K 2205/04* (2013.01)

(58) Field of Classification Search
USPC .................. 374/208, 179, 100, 163
See application file for complete search history.

(56) References Cited

U.S. PATENT DOCUMENTS

2004/0114664 A1*   6/2004   Park .................... G01K 1/12
                                                            374/179
2013/0223478 A1*   8/2013   Landis .................. G01K 1/08
                                                            374/144

FOREIGN PATENT DOCUMENTS

CA           1 288 174 C        8/1991
DE    20 2008 018089 U1         9/2011
(Continued)

OTHER PUBLICATIONS

Translation of DE 202008018089 Sep. 2, 2011 (Year: 2011).*
(Continued)

*Primary Examiner* — Mirellys Jagan
(74) *Attorney, Agent, or Firm* — Osha Liang LLP

(57) ABSTRACT

The invention relates to a method for manufacturing a temperature sensor with a thermocouple, which includes the following consecutive steps: a) manufacturing a cable with mineral insulator (14) including two thermocouple wires (10, 12) extending along the entire length of the cable with mineral insulator and embedded in a mineral insulator (8); b) stripping one of the ends of the cable with mineral insulator over a length of 2 to 20 mm, preferably less than 15 mm, preferably less than 10 mm, such as to expose the ends of the thermocouple wires; c) connecting the ends (40, 42) of the thermocouple wires thus exposed, such as to constitute a thermocouple hot spot (13); and d) attaching a cap (20) to said cable with mineral insulator so as to protect said hot spot.

8 Claims, 1 Drawing Sheet

(51) Int. Cl.
*G01K 13/00* (2006.01)
*G01K 1/08* (2006.01)
*G01K 7/02* (2006.01)

(56) References Cited

FOREIGN PATENT DOCUMENTS

GB      1000462 A    8/1965
GB      1252754 A    11/1971

OTHER PUBLICATIONS

International Search Report issued in PCT/FR2015/053119 dated Feb. 1, 2016 (2 pages).
Written Opinion of the International Searching Authority issued in PCT/FR2015/053119 dated Feb. 1, 2016 (5 pages).

* cited by examiner

TEMPERATURE SENSOR

TECHNICAL FIELD

The invention relates to a temperature sensor including a thermocouple intended to measure temperatures comprised between −40° C. and 1200° C., in particular in a heat engine unit of an automotive vehicle.

BACKGROUND THE INVENTION

As illustrated in FIG. 1, a temperature measuring device traditionally includes a temperature sensor 2 extended by an extension cable 3 making it possible to connect the temperature sensor to a measuring apparatus. The temperature sensor 2 traditionally includes a metal protective sheath 5 and a stop 6, mounted on the protective sheath 5 and adapted based on the targeted application.

The measuring apparatus 4 is intended to interpret the electrical signal supplied by the temperature sensor 2 and sent via the extension cable 3. This interpretation is an evaluation of the temperature to which the end of the temperature sensor is subjected.

Inside the protective sheath 5, the temperature sensor 2 traditionally includes a thermocouple 7 and a mineral insulator 8, traditionally made from alumina or magnesia, which allows the thermocouple to withstand environmental stresses, and in particular high temperatures.

As illustrated in FIG. 2, the thermocouple 7 is an assembly of first and second conductive wires 10 and 12, respectively, connected to one another and end to end at a hotspot 13. The difference in potential ΔU across the terminals of the first and second conductive wires depends on the difference between the temperature at the hotspot $T_1$ and the temperature $T_0$ across said terminals, according to the well-known Seebeck effect.

A temperature sensor with a thermocouple is in particular used in a heat engine unit, in which it is subject to temperatures comprised between −40° C. and 1200° C.

To manufacture a temperature sensor intended for such applications, the following steps are traditionally carried out:

First, a mineral insulated cable (MIC) 14 is manufactured.

A mineral insulated cable includes a metal protective sheath 5 and, inside the protective sheath 5, two thermocouple wires 10 and 12 made from a material suitable for forming a thermocouple, the two thermocouple wires being isolated from one another and from the protective sheath 5 using the mineral insulator 8 (FIG. 3a).

To form the junction between two thermocouple wires, or "hotspot" 13, a small amount of mineral insulator is removed from the ends of the cable, for example by sanding or scraping, typically over a depth of about 2 to 10 mm. At this so-called "distal" end, the two thermocouple wires thus emerge from the insulator, while being surrounded by the protective sheath 5 (FIG. 3b).

The two ends of the thermocouple wires thus freed are brought mechanically closer until coming into contact with one another, then are connected, for example by electric welding (FIG. 3c).

The hollowed end of the protective sheath can next optionally be filled with insulating material, identical to or different from the insulating material of the mineral insulated cable. The protective sheath is next closed (arrows of FIG. 3c) so as to protect the thermocouple, for example by electric welding (FIG. 3d).

Furthermore, after closing the protective sheath 5 or before cutting the mineral insulated cable, a throat 15 is traditionally produced at the distal end of the protective sheath 5, traditionally by wire drawing or hammering. The throat traditionally makes it possible to improve the response time of the temperature sensor without substantially affecting its ability to withstand vibrations.

Such a manufacturing method is difficult to automate and currently involves delicate manual operations.

There is therefore a need for a solution making it possible to facilitate the automation of the manufacture of a temperature sensor with thermocouple.

One aim of the invention is to meet this need.

BRIEF DESCRIPTION OF THE INVENTION

The invention proposes a method for manufacturing a temperature sensor with a thermocouple, including the following consecutive steps:

a) manufacturing a mineral insulated cable (MIC) including a protective sheath and two thermocouple wires extending in the protective sheath along the entire length of the cable and embedded in a mineral insulator;

b) stripping one of the ends of the mineral insulated cable over a length of 2 to 20 mm, preferably less than 15 mm, preferably less than 10 mm, so as to expose the ends of the thermocouple wires;

c) connecting the ends of the thermocouple wires thus exposed, so as to constitute a thermocouple hotspot;

d) attaching a cap to said mineral insulated cable so as to protect said hotspot.

As will be seen in more detail in the rest of the description, it is therefore no longer necessary to close the protective sheath on itself in order to protect the thermocouple wires, or to remove mineral insulator to hollow out the protective sheath, which makes the manufacturing method much easier to automate.

A method according to the invention may further include one or more of the following preferred optional features:

the cap has a throat, the diameter of the throat at the hotspot after step d) being less than 2.5 mm;

after step d), the cap covers more than 90% of the outer side surface of the protective sheath;

the cap is configured to abut with the edge of the protective sheath and/or to guide the mounting of the cap on the protective sheath;

before mounting the cap, the cap is filled with insulating material such that after the cap is mounted, the ends of the thermocouple wires are insulated from the outside by said insulating material;

the mineral insulated cable is inserted into a reinforcing tube such that said reinforcing tube at least partially covers the protective sheath.

The invention also proposes a temperature sensor with a thermocouple including a mineral insulated cable including two thermocouple wires defining a hotspot and a protective sheath, and a cap fastened so as to hermetically protect said hotspot.

A temperature sensor according to the invention may in particular be manufactured using the method according to the invention, optionally adapted so that the temperature sensor has one or several of the optional features described below.

A temperature sensor according to the invention may further include one or more of the following preferred optional features:

preferably, the mineral insulated cable has no throat;
preferably, the cap has a throat, the outer diameter of which at the hotspot is preferably less than 3.5 mm, or even less than 3 mm, or less than 2 mm, or less than 1.5 mm;
the cap covers more than 10%, more than 30%, more than 60%, more than 90%, preferably substantially 100% of the outer side surface of the protective sheath;
the cap is configured to abut with the edge of the protective sheath and/or to guide the mounting of the cap on the protective sheath;
the temperature sensor includes a reinforcing tube at least partially covering the protective sheath of the mineral insulated cable;
the wall of the reinforcing tube has a thickness greater than 0.3 mm and/or smaller than 1.2 mm;
the cap and the reinforcing tube together cover more than 10%, more than 30%, more than 60%, more than 90%, preferably substantially 100% of the outer side surface of the protective sheath of the mineral insulated cable;
the temperature sensor includes a mechanical stop fastened, preferably welded, on the protective sheath with a reinforcing tube;
the cap is fastened on the protective sheath of the mineral insulated cable and/or on a reinforcing tube containing the mineral insulated cable;
the cap is fastened, preferably by laser welding, to a distal end of the protective sheath and/or, preferably, on the outer side surface of the protective sheath;
the cap is filled with an insulating material, preferably in powder form, identical to or different from the insulating material of the mineral insulated cable, preferably made from a material chosen from among alumina and/or magnesia.

The invention also relates to the use of a temperature sensor according to the invention in an environment with a temperature above 800° C., above 900° C., above 1000° C., above 1100° C., and/or below −20° C., below −30° C., preferably varying between −40° C. and 1200° C., and in particular in a heated engine unit of an automotive vehicle.

The invention lastly relates to a heat engine unit of an automotive vehicle including a temperature sensor according to the invention, and an automotive vehicle including a heat engine unit according to the invention. The temperature sensor can in particular be positioned in the exhaust manifold upstream from a turbine of a turbocompressor or in a fuel or fuel oxidizer intake tubing or in an exhaust tubing.

BRIEF DESCRIPTION OF THE FIGURES

Other features and advantages of the invention will appear upon reading the following detailed description, and examining the appended drawing, in which.

DEFINITIONS

"Proximal" and "distal" distinguish the two sides of a temperature sensor according to the invention. The "distal" side is that of the hotspot.

A "hotspot" traditionally refers to the junction between the two thermocouple wires, independently of its temperature.

"Including a", "having a" or "comprising a" means "including at least one", unless otherwise indicated.

Identical references are used to designate similar members in the various figures.

DETAILED DESCRIPTION

Figure 1:
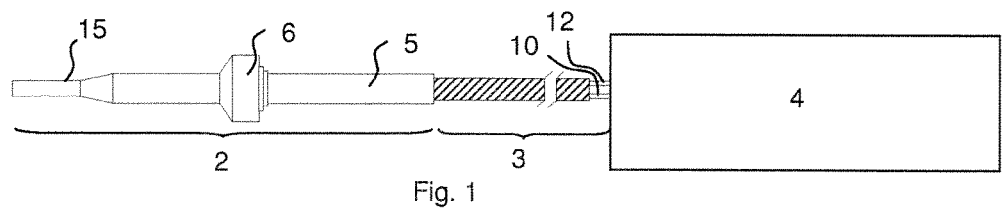
FIG. 1 schematically shows a temperature sensor connected to a measuring apparatus.
Figure 2:
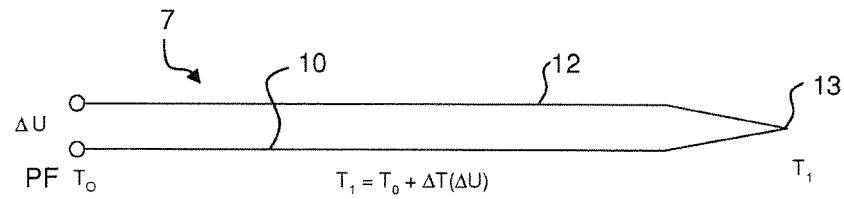
FIG. 2 schematically illustrates the operating principle of a thermocouple.
Figures 3A, 3B, 3C, 3D:
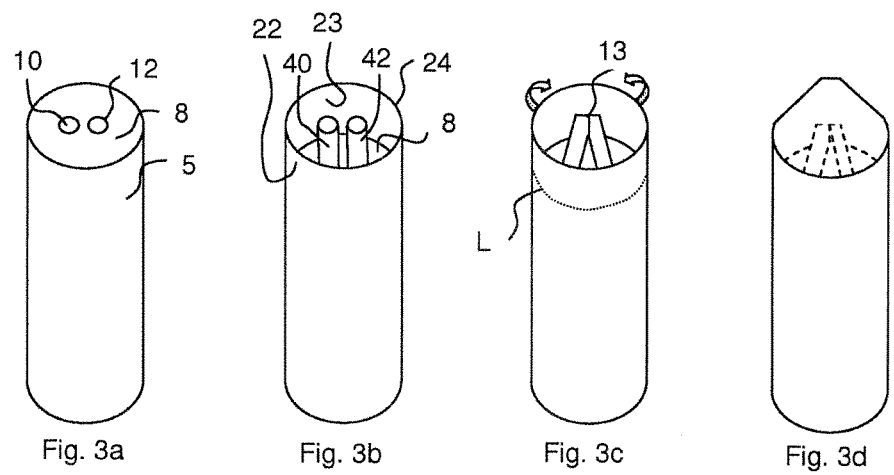
FIG. 3 (FIGS. 3a to 3d) illustrates the method for manufacturing a temperature sensor according to the prior art.
Figure 4:
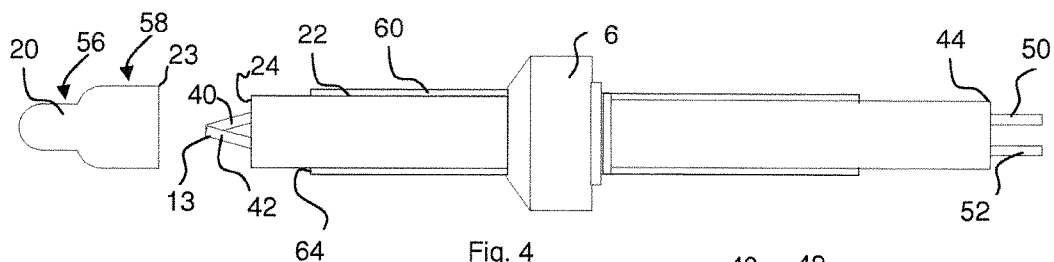
FIG. 4 shows a temperature sensor according to the invention, before fastening the cap.

FIGS. 1 to 3 having been described in the preamble, we will now turn to FIG. 4.

Any mineral insulated cable of the prior art used to manufacture a sensor with a thermocouple can be implemented.

Preferably, the outer diameter of the protective sheath 5 is greater than 4 mm, preferably greater than or equal to 4.5 mm and/or less than 7 mm, preferably less than 6 mm.

The protective sheath can be made from an electrically conductive material.

The thermocouple wires can be flexible or rigid. Preferably, they have a substantially circular cross-section. Also preferably, the largest dimension and/or the smallest dimension of a cross-section of a thermocouple wire is greater than or equal to 0.2 and/or less than or equal to 1.

According to one embodiment of the invention, the pair of materials of the first and second thermocouple wires 10 and 12 is chosen from the group made up of the following pairs of materials: NiSil/NiCroSil.

The protruding parts 50 and 52 of the thermocouple wires 10 and 12 that extend potentially past the proximal end 44 of the mineral insulated cable can have a length greater than 5 cm, greater than 10 cm, greater than 20 cm, greater than 50 cm. Advantageously, these wires can thus serve as an extension cable 3, to electrically connect the temperature sensor 2 of the measuring apparatus 4. Of course, if the thermocouple wires are used as an extension cable, said protruding parts 50 and 52 must be electrically insulated.

At the proximal end, the thermocouple wires 10 and 12 include electrical connecting means, for example connecting terminals allowing them to connect to the measuring apparatus 4 and/or to an extension cable 3.

Also preferably, a mechanical stop 6 is fastened, preferably welded, on the outer side surface of the protective sheath. The mechanical stop 6 advantageously allows a precise local adaptation of the diameter of the temperature sensor, and therefore good suitability for the targeted application.

Preferably, the largest transverse dimension of the mechanical stop (i.e., in a plane perpendicular to the longitudinal direction corresponding to the length of the mineral insulated cable) is greater than 8 mm and/or less than 25 mm.

As shown in FIG. 4, the protection defined, according to the prior art, by the protective sheath 5 of the mineral insulated cable 14 is replaced by a cap 20.

Preferably, the cap is made from Inconel.

Preferably, the maximum outer diameter of the cap 20 is greater than 4 mm, preferably greater than or equal to 4.5 mm and/or less than 7 mm, preferably less than 6 mm.

Preferably, the cap has a throat 56. The use of an attached cap advantageously makes it easier to obtain complex shapes for the throat. Furthermore, the risks of damaging the thermocouple wires are reduced.

Also preferably, the throat 56 extends to the distal end of the cap 20, as shown. Advantageously, a throat 56 improves the response time of the sensor.

To have an appropriate response time, the outer diameter of the throat at the hotspot is preferably smaller than 3.5 mm, or even smaller than 3 mm, or even smaller than 2 mm, or even smaller than 1.5 mm.

The throat 56 can also serve as a mechanical stop facilitating the assembly of the cap 20 on the mineral insulated cable. Also preferably, the cap 20 includes, in the extension of the throat 56, a wider part 58 with a shape substantially complementary to the mineral insulated cable, such that the mineral insulated cable can guide the cap 20 during mounting thereof.

Preferably, the cap is filled with an insulating material, preferably powder, preferably mineral in nature, which could be identical to or different from that contained in the protective sheath of the mineral insulating cable. Preferably, the insulating material is a material chosen from among alumina and/or magnesia.

According to the invention, the temperature sensor is manufactured according to steps a) to d) above.

Steps a) to c) can correspond to the steps traditionally carried out according to the prior art, as described in the preamble.

In step a), a mineral insulated cable or mineral insulated cable segment is prepared.

In step b), unlike a traditional method, the ends of the thermocouple wires or strips, i.e., the part of the protective sheath that surrounds them (and that contains the mineral insulator that is traditionally removed) is cut, so as to free the distal ends of the thermocouple wires.

The cutting line L is shown in dotted lines in FIG. 3c. The stripping operation preferably consists of simultaneously cutting the protective sheath and the mineral insulator in the transverse plane containing the cutting line L, then removing the section thus cut so as to expose the distal ends 40 and 42 of the thermocouple wires.

Figure 5:
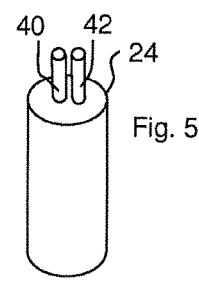
FIG. 5 shows a temperature sensor according to the invention, before stripping.

At the end of step b), the ends of the thermocouple wires thus extend longitudinally (lengthwise along the mineral insulated cable) past the protective sheath and the mineral insulator, as shown in FIG. 5. The absence of a belt (by the protective sheath) around the two ends of the thermocouple wires greatly facilitates their connection, in particular their welding, in step c).

In step c), as shown in FIG. 4, the distal ends 40 and 42 of the thermocouple wires 10 and 12 are next connected to one another, i.e., placed in physical and electrical contact, permanently, so as to form a hotspot 13. The connection is preferably done by hot welding.

In step d), the thermocouple resulting from the connection of the two thermocouple wires is protected using a cap 20, preferably made from Inconel.

The cap 20 can be fastened on the outer side surface 22 of the protective sheath. In one embodiment, the edge 23 of the cap 20 (which defines the opening of the cap 20) can be fastened on the edge 24 of the protective sheath of the mineral insulating cable.

The cap 20 can be rigidly fastened by any means, for example using an appropriate glue, preferably welded, so as to define a hermetic chamber housing the protruding distal parts 40 and 42 of the thermocouple wires.

Preferably, said chamber is filled with an insulating material, identical to or different from the mineral insulator of the mineral insulated cable, preferably powder, positioned in the cap before fastening thereof on the support tube 30. The insulating material powder can in particular be an alumina powder or a magnesia powder.

Preferably, the temperature sensor also includes a reinforcing tube 60, preferably made from stainless steel, at least partially covering the protective sheath.

Preferably, the reinforcing tube 60 extends the cap 20 in order to cover, with it, at least part, preferably all of the outer side surface of the protective sheath. Preferably, the cap and the reinforcing tube together define an enclosure around the mineral insulating cable. Preferably, this enclosure is sealed at least in the part of the temperature sensor that extends from the mechanical stop 6 up to the distal end 62 of the temperature sensor, preferably in the part of the temperature sensor that extends from the proximal end of the mineral insulated cable to the distal end 62 of the temperature sensor.

Preferably, the wall of the reinforcing tube has a thickness comprised between 0.3 mm and 1.2 mm.

Also preferably, the opening of the reinforcing tube 60 has a shape substantially complementary to the outer side surface of the protective sheath 5.

In one embodiment, the cap 20 is fastened on the edge 64 of the distal end of the reinforcing tube 60 and/or on its inner surface or its outer surface. In one embodiment, the cap 20 and the reinforcing tube 60 form a monolithic assembly, i.e., the reinforcing tube 60 is integral with the cap 20.

As clearly shown in this description, the steps of a manufacturing method according to the invention are simple and can be automated. This results in a significant reduction in the manufacturing cost.

The invention also makes it possible to obtain complex shapes for the throat. Lastly, it leads to a very substantial reduction in the risks of damaging the thermocouple wires.

Of course, the invention is not limited to the embodiment described and illustrated, which has been provided for illustration purposes only.

The invention claimed is:

1. A method for manufacturing a temperature sensor with a thermocouple, comprising the following, executed consecutively:
    manufacturing a mineral insulated cable including a protective sheath and two thermocouple wires extending in the protective sheath along the entire length of the cable and embedded in a mineral insulator;
    stripping one of the ends of the mineral insulated cable over a length of 2 to 20 mm, to expose the ends of the thermocouple wires;
    connecting the ends of the exposed thermocouple wires, to constitute a thermocouple hotspot; and
    attaching a cap to said mineral insulated cable to protect said hotspot,
    wherein the cap has a throat, and wherein a diameter of the throat at the hotspot after attaching the cap to the mineral insulated cable is less than 2 mm.

2. The method according to claim 1, wherein after attaching the cap to the mineral insulated cable, the cap covers more than 90% of the outer side surface of the protective sheath.

3. The method according to claim 1, wherein the cap is configured to abut with an edge of the protective sheath and/or to guide mounting of the cap on the protective sheath during the attaching of the cap.

4. The method according to claim 1, wherein, before mounting the cap, the cap is filled with insulating material such that after the cap is mounted, the ends of the thermocouple wires are insulated from an outside of the cap by said insulating material.

5. The method according to claim 1, wherein the mineral insulated cable includes the protective sheath and wherein the mineral insulated cable is inserted into a reinforcing tube such that said reinforcing tube at least partially covers the protective sheath.

6. A temperature sensor manufactured using a method according to claim 1.

7. A heat engine unit of an automotive vehicle including a temperature sensor according to claim 6.

8. A method of using a temperature sensor according to claim 6 comprising disposing the temperature sensor in an environment at a temperature above 1100° C.

* * * * *